US012196060B2

(12) United States Patent
Murtaza

(10) Patent No.: US 12,196,060 B2
(45) Date of Patent: Jan. 14, 2025

(54) SYSTEM FOR CONTROLLING PERFORMANCE OF SALT WATER DISPOSAL WELLS

(71) Applicant: Saudi Arabian Oil Company, Dhahran (SA)

(72) Inventor: Shoaib Murtaza, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 496 days.

(21) Appl. No.: 17/549,669

(22) Filed: Dec. 13, 2021

(65) Prior Publication Data

US 2023/0184062 A1    Jun. 15, 2023

(51) Int. Cl.
*G05B 13/04* (2006.01)
*E21B 41/00* (2006.01)
*E21B 47/07* (2012.01)

(52) U.S. Cl.
CPC .......... *E21B 41/0057* (2013.01); *E21B 47/07* (2020.05); *G05B 13/04* (2013.01); *E21B 2200/20* (2020.05)

(58) Field of Classification Search
CPC .. E21B 41/0057; E21B 47/07; E21B 2200/20; G05B 13/04
See application file for complete search history.

(56) References Cited

U.S. PATENT DOCUMENTS

| | | | |
|---|---|---|---|
| 11,078,757 B2 | 8/2021 | Abou-Sayed et al. | |
| 11,493,665 B1* | 11/2022 | Putcha | E21B 43/00 |
| 2014/0290942 A1 | 10/2014 | Brodie et al. | |
| 2016/0063402 A1* | 3/2016 | Webb | G06Q 10/067 |
| | | | 705/348 |
| 2016/0298447 A1* | 10/2016 | Mohaghegh | E21B 47/10 |
| 2018/0171769 A1* | 6/2018 | Gu | E21B 43/267 |
| 2019/0145251 A1* | 5/2019 | Johnson | E21B 43/26 |
| | | | 166/250.1 |
| 2021/0372261 A1* | 12/2021 | Miller | G05B 13/0265 |

OTHER PUBLICATIONS

Groundwater Protection Council, "Injection wells: A guide to their use, operation, and regulation," Jun. 2021, 37 pages.
McCurdy, "Underground injection wells for produced water disposal," Chesapeake Energy Corporation, Mar. 2011, 34 pages.

* cited by examiner

*Primary Examiner* — Gary Collins
(74) *Attorney, Agent, or Firm* — Fish & Richardson P.C.

(57) ABSTRACT

Systems and methods for monitoring and managing day to day performance of a group of salt water disposal wells in a network include performing operations including performing a well measurement to generate salt-water disposal (SWD) well data; retrieving a machine learning model that is trained using labeled SWD data, the labeled SWD data representing one or more SWD well faults causing respective data signatures in the SWD data, each respective data signature being associated with a corresponding label identifying the SWD well fault for a particular SWD well; inputting the SWD well data generated in real-time based on SWD well operation, into the machine learning model; generating, by the machine learning model based on the inputting, a classification output representing a predicted well injection pressure or injection rate of the particular SWD well including SWD wells faults/anomalies; and generating, based on the classification output, control data for changing operation of the particular SWD well.

20 Claims, 9 Drawing Sheets

SYSTEM FOR CONTROLLING PERFORMANCE OF SALT WATER DISPOSAL WELLS

TECHNICAL FIELD

The specification generally relates to oil and gas exploration and production. More specifically, the specification describes methods and systems related to monitoring and managing day to day performance of a group of salt water disposal wells in a network.

BACKGROUND

Salt water disposal (SWD) wells are drilled side by side with normal oil and gas wells. SWD wells dispose-off produced water back into a subsurface region. At the same time, the injection of disposed water into subsurface maintains subsurface reservoir pressure and aids in producing more oil and gas from the subsurface region.

Proper maintenance of SWD well integrity and well performance is vital for overall oil field performance. Any untoward casing leaks, if not detected on time, may lead to subsurface blowout. The maintenance of SWD wells enables detection of performance decline. If the decline is not rectified on time, a lower injection in SWD wells can result, which may negatively affect oil & gas production from a field.

SUMMARY

This specification describes an approach for monitoring and managing day to day performance of a group of salt water disposal wells (SWD) connected to one disposal network. SWD wells are configured for disposing of produced salty water from a reservoir with oil production and at the same time for maintaining reservoir pressure to get maximum oil output from subsurface oil reservoir.

A system (such as a data processing system) is configured to monitor and control performance and operations and SWD operation from operational data acquired from & surface near the wellhead of SWD wells. The operational data can be gathered from a data acquisition system (DAS) in real-time or near-real time as the well is operating. Generally, the operational data include data acquired during use of the SWD well. For example, the operational data include a real-time injection rate, an injection pressure, a fluid or well temperature, a casing-to-casing annulus pressure, and so forth.

The data processing system described in this specification is configured to receive the data from the DAS associated with each of one or more SWD wells. The operational data are captured by the sensors of the DAS and relayed to the data processing system, which may be located inside an oil/water plant. The operational data can be presented to an engineer at a client terminal for validation and analysis.

The data processing system includes a plurality of data processing modules that can operate in parallel. The operational data are processed for three general categories, including predictive applications, analytic applications, and supervisory applications. The data processing modules are integrated and together process the operational data in real-time or in near real-time. Here, real-time or near real-time refers to processing the operational data as the operational data are generated by and received from the one or more sensors of the DAS. The data processing system processes these data and outputs a result as the data are received. In real-time processing, delays between data generation from sensors and output data generation from the data processing system are generally due to transmission and processing latency, rather than due to storage of data by the data processing system for later processing (such as batch processing). Additionally, real-time sensor data are measured and generated approximately concurrently with the corresponding physical operation such that a control system (e.g., data processing system) is configured to process the data and cause a reaction to the data with minimal latency (e.g., latency allowances for processing the data and transmitting the data, etc.).

The data processing system is configured for automation using one or more machine learning models, minimizing production engineer interventions on daily basis for controlling operation and performance of SWD wells. For example, validation of field data is automated without daily intervention of field engineer. The data processing system is trained to filter outliers/noise data. The thresholds for this filtering are set by machine learning models. For example, injection pressure and injection rate are used to calculate well injectivity. Machine learning models perform linear regression model and decision tree analysis to flag if the well requires a treatment or intervention to restore injectivity.

The data processing system uses machine learning models to analyze data such as injection pressure, injection rate, and casing-casing annulus (CCA) pressure data to detect anomalies, such as downhole casing leaks. Specifically, linear regression and decision tree algorithms are configured to flag potential downhole casing leaks. Once a probable fault is flagged, a field engineer deploys physical engineering diagnostic tools to confirm the leak.

The data processing system uses machine learning models to analyze data such as a daily injection rate. The injection rate is compared with an assigned target rate for the individual well and for other wells in network (such as all wells in the network). In an example, variance above and below 10% for a given well can be used to trigger an alarm. The alarm enables adjustment (either automatically or manually) a choke in the field to make a given well compliant with an assigned target rate.

Generally, the training data for the machine learning models includes injection pressure and injection rate. In some implementations, data from confirmed downhole casing leaks scenarios (such as measured pressures or other downhole values) are used to train the machine learning algorithm. Apart from real-time DAS data latest reservoir data like static bottom hole pressure (SBHP), an injectivity index (II) is utilized from a well database during processing. SBHP & II data are captured real-time or by wireline method for each well (e.g., at a monthly frequency).

The methods and systems described in this specification are able to overcome technical issues with development of models for controlling SWD operation. For example, prediction models based on machine-learning (ML) and deep-leaning (DL) for the prediction of foreseeable injectivity decline described in this specification can overcome constraints of having limited training data and can be generalized to different wells. The machine learning models can satisfy a minimum accuracy requirement and are used to guide real-time operations. The models are configured to use scarce data from a limited number of considered wells for prediction of anomalies or for proposing solutions to existing anomalies during SWD well operation, even though all conditions and characteristics leading to a given anomaly may not be present in the training data. The machine learning models described in this specification are configured to predict anomalies without requiring training to identify every single SWD operation.

The implementations described throughout this specification enable one or more of the following advantages. Accurate models for the operation of SWD wells and/or prediction of anomalies in operation may significantly reduce non-productive time. Conventional methods for controlling SWD operation based on operational data can depend on a judgement or experience of users, which is time consuming. Manual review can cause resulting inconsistencies between or among operational practices in different wells across a same field/reservoir because of differing judgements of different experts. The data processing system is configured for automatic identification and flagging of different anomalies and automatic control of the SWD wells using a supervised machine learning approach. The machine learning model is trained to recognize operational issues and generate responses (such as control signals) to resolve those issues.

One or more of the above advantages are enabled by the following embodiments.

In a general aspect, a process for monitoring and managing day to day performance of a network of salt water disposal wells includes the following operations. The operations include performing a well measurement to generate salt-water disposal (SWD) well data; retrieving a machine learning model that is trained using labeled SWD data, the labeled SWD data representing one or more SWD well faults causing respective data signatures in the SWD data, each respective data signature being associated with a corresponding label identifying the SWD well fault for a particular SWD well; inputting the SWD well data generated in real-time based on SWD well operation, into the machine learning model; generating, by the machine learning model based on the inputting, a classification output representing a predicted well injection pressure or injection rate of the particular SWD well including SWD wells faults/anomalies; and generating, based on the classification output, control data for managing operation of the particular SWD well.

In some implementations, the operations include receiving reservoir data from well database at the machine learning model to classify well performance and well integrity of the particular SWD well; based on a classification, generating an alarm identifying a fault, the alarm enabling a field engineer to rectify the fault in a timely manner; and enabling control, based on the control data and the alarm, of an injection rate, an injection pressure, or both the injection rate and injection pressure of a SWD well.

In some implementations, the operations include training the machine learning model prior to inputting the SWD well data, wherein training the machine learning model comprises: obtaining SWD well data from the one or more SWD wells in an environment; labeling the SWD well data as representing an expected relationship between an injection pressure and an injection rate of the SWD well; and inputting the labeled SWD well data into the machine learning model to train the machine learning model.

In some implementations, the SWD data include at least one of an injection rate, an injection wellhead pressure, a wellhead temperature, and a casing-casing annulus pressure.

In some implementations, the machine learning model comprises a supervised machine learning model.

In some implementations, the operations include performing a data quality check for the measured SWD data, the data quality check configured to remove data comprising missing values, out of range values, saturated sensor values, or values from a damaged sensor.

In some implementations, the operations include generating alert data, based on the control data, the alert data instructing a controller of the SWD well to reduce or increase an injection rate to meet target rate compliance.

In a general aspect, a data processing system is for monitoring and managing day to day performance of a group of salt water disposal wells in a network. The data processing system includes one or more sensors; at least one processor; and a memory storing instructions that, when executed by the at least one processor, cause the at least one processor to perform operations. The operations include performing a well measurement to generate salt-water disposal (SWD) well data; retrieving a machine learning model that is trained using labeled SWD data, the labeled SWD data representing one or more SWD well faults causing respective data signatures in the SWD data, each respective data signature being associated with a corresponding label identifying the SWD well fault for a particular SWD well; inputting the SWD well data generated in real-time based on SWD well operation, into the machine learning model; generating, by the machine learning model based on the inputting, a classification output representing a predicted well injection pressure or injection rate of the particular SWD well; and generating, based on the classification output, control data for changing operation of the particular SWD well.

In a general aspect, one or more non-transitory computer readable media store instructions for monitoring and managing day to day performance of a group of salt water disposal wells in a network. The instructions, when executed by at least one processor, configured to cause the at least one processor to perform operations that include the following. The operations include performing a well measurement to generate salt-water disposal (SWD) well data; retrieving a machine learning model that is trained using labeled SWD data, the labeled SWD data representing one or more SWD well faults causing respective data signatures in the SWD data, each respective data signature being associated with a corresponding label identifying the SWD well fault for a particular SWD well; inputting the SWD well data generated in real-time based on SWD well operation, into the machine learning model; generating, by the machine learning model based on the inputting, a classification output representing a predicted well injection pressure or injection rate of the particular SWD well including SWD wells faults/anomalies; and generating, based on the classification output, control data for changing operation of the particular SWD well.

The details of one or more embodiments of these systems and methods are set forth in the accompanying drawings and the description to be presented. Other features, objects, and advantages of these systems and methods will be apparent from the description and drawings, and from the claims.

BRIEF DESCRIPTION OF DRAWINGS

Like reference symbols in the various drawings indicate like elements.

DETAILED DESCRIPTION

Figure 1A:
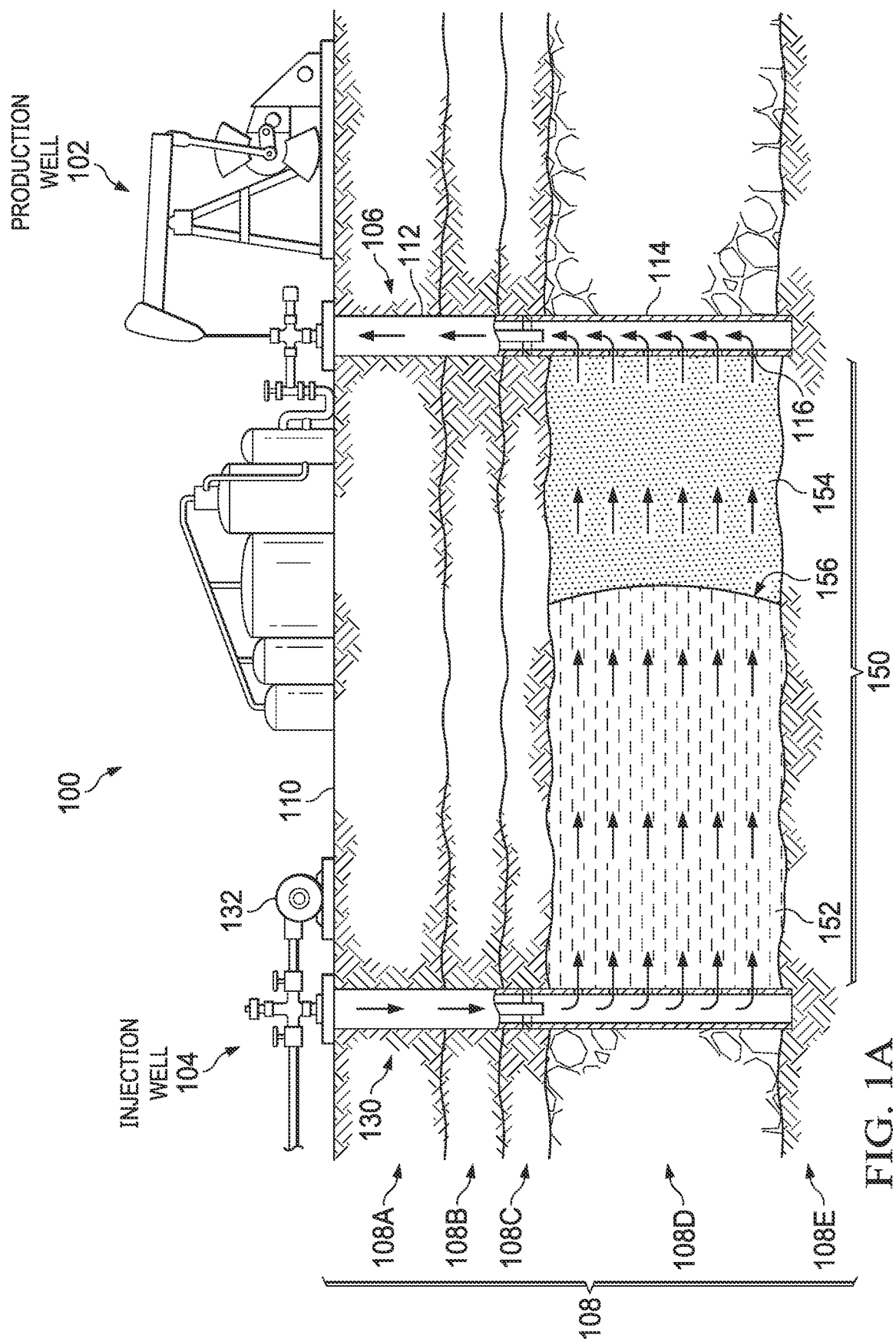
FIG. 1A is a schematic view of a system for generation of field performance data.

FIG. 1A is a schematic diagram of wellbore system 100 that includes a production well 102 and an injection well 104. The production well 102 includes a vertical wellbore 106 formed into a subterranean formation 108. In some examples, the wellbore 106 is formed by drilling into one or more layers of the subterranean formation 108. In this example, the wellbore 106 extends through four layers 108A-D and lands in subterranean layer 108E. In this example, a reservoir 150 of hydrocarbon 154 (e.g., oil) is located within subterranean layer 108D. The reservoir 150 includes porous shale rock with pores that contain the hydrocarbon 154 and/or sandstone with the hydrocarbon 154 located between the grains of the sandstone.

The production well 102 includes a production casing 114 formed downhole of a surface casing 112. In some examples, both the surface casing 112 and the production casing 114 are formed and set within the wellbore 106 by pouring cement between each respective casing 112, 114, and the subterranean layers 108A-E. The production casing 114 includes one or more perforations 116 that allow the hydrocarbon 152 to flow from the reservoir 150 into the wellbore 106 and up to the ground surface 110.

The injection well 104 includes a wellbore 130 that is the same as the wellbore 106 of the production well 102 except for the following differences. The injection well 104 received disposal water from GOSP through disposal network for injection into the reservoir 150. In some examples, the injection of the fluid 152 increases a recovery of the hydrocarbon 154 from the reservoir 150 because the fluid 152 forces the hydrocarbon 154 through the porous shale and sandstone rock to the production well 102. The region where the fluid 152 and the hydrocarbon 154 interact is represented by region 156. In some examples, the process of injecting water 154 into the reservoir 150 for this purpose is referred to as "waterflooding."

Figure 1B:
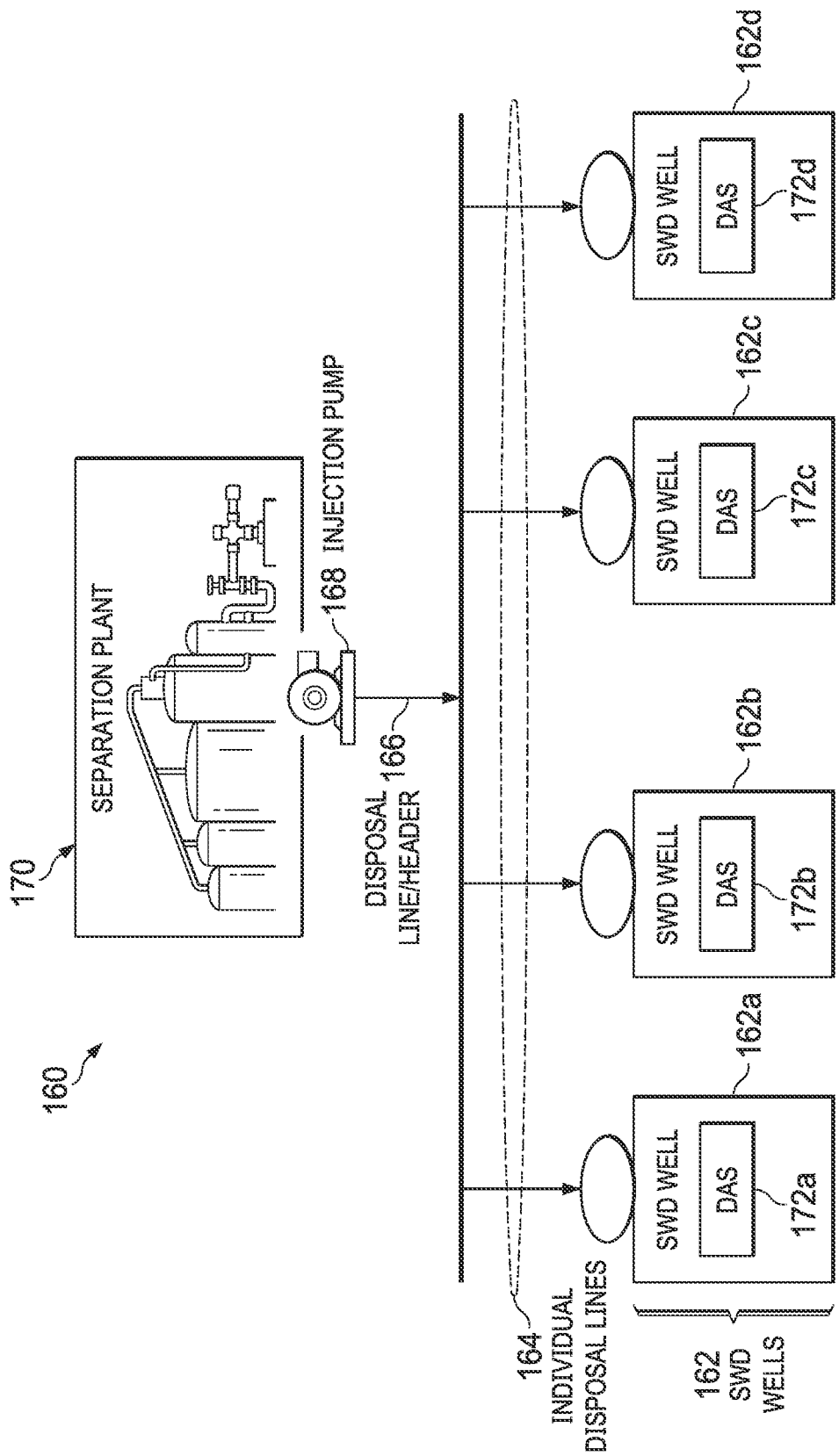
FIG. 1B represents a schematic of a network of SWD wells.

FIG. 1B shows a network 160 of SWD wells 162 spread over a region, such as a field. The network of wells 160 receives disposal water through disposal header 166 from a separation plant (GOSP) 170. Produced oil/gas from field is collected at the nearest GOSP 170. The GOSP 170 separates oil/gas from the produced water. The separated produced water is sent by injection pump 168 to disposal header and through disposal header to all connected SWD wells 162a-d.

A data processing system receives real-time data from measurements made by a sensor tool near SWD 104 wellhead on continuous basis during well operation (on or shut-off). The sensor tools (DAS) provide data such as injection rate, an injection wellhead pressure, a wellhead temperature, a casing-casing annulus pressure.

The data processing system receives the real-time data from one or more SWD wells 162 and processes the data with parallel modules to manage performance of the SWD wells. As previously described, the well performance data includes an injection rate, an injection wellhead pressure, a wellhead temperature, a casing-casing annulus pressure, or one or more other related parameter values including data from the DAS 172a-d for a typical SWD well 162. Apart from real-time data, other reservoir data like SBHP, Injectivity Index (II) data are utilized from well data base for decision tree and conditional analysis, subsequently described. The data processing system, using the integrated modules as subsequently described, is configured to process these data values to perform at least three functions. These functions include predictive functions, analytic functions, and supervisory functions for controlling the SWD wells.

The predictive module is configured to predict future SWD well performance based on real-time measurements of well injection rate and well injection pressure. The well performance refers to an injectivity level which is useful for determining a well injection volume (e.g., amount of disposed water). The predictive module is configured to track current and historic injectivity levels and predict whether the injectivity level for one or more wells is maintained within a threshold distance of a desired value. The prediction module is configured to determine if there is a current or predicted injectivity decline in the well. The predictive module is configured to generate data including an alarm, which may specify predicted injectivity levels and a recommended prophylactic measure to enable a user (such as an engineer) to act proactively and plan for well treatment to restore production.

Apart from real-time data, other reservoir data like SBHP, Injectivity Index (II) data are utilized from a SWD well database for decision tree and conditional analysis. Every field has an average injectivity rate, such as barrels of water injected per day per psi wellhead injection pressure. The rise in injection pressure for same amount of injection rate that is decline in well injectivity performance may be due to near wellbore reservoir damage or increase in reservoir 150 pressure or due to wellbore 130 obstruction. The data processing system identifies issues either due to reservoir damage or wellbore obstruction and ignores the issue resulting from an increase in reservoir pressure. In some implementations, a field engineer receives the prediction and is enabled to perform treatment after performing some additional field diagnostic work. Historical or training data are used to train the model of the data processing system so that linear regression of current data can be performed to detect any anomaly in well injectivity performance and cause an alarm to be generated.

The analytic module is configured to analyze (either intermittently or continuously) an injection rate and an injection pressure. The analytic module compares the injection rate to the injection pressure to identify well integrity issues, such as downhole casing leaks or ruptures. Downhole casing leak is a critical issue to be identified. The injection rate and inject pressure are plotted simultaneously. These two parameters correlate positively under normal operational conditions. An inverse correlation between these two parameters (such as a rate increase and injection pressure drop) causes alarm data to be generated for taking proper field diagnostic work. Based on historical database or training data, the process can be trained to pick-up probable downhole casing leaks. Generally, a 10% drop in injection pressure and corresponding 10% increase in injection rate (corresponds to approximately 20% increase in well injectivity) is a threshold for concern. The data processing system cross checks the output against SBHP data to confirm that drop in reservoir pressure in area is not the reason for this anomaly.

The analytic module is configured to recommend actions to be taken by a user in diagnostic reports. Once an alarm is generated by the data processing system, a field engineer performs available field/engineering diagnostics to confirm the leak. Once confirmed, the casing leak can be fixed by running liner or casing patch. If proved false, the training data can be utilized to improve ML algorithm.

A supervisory module is configured to monitor well compliance. This module specifically monitors injection rate compliance, which a critical parameter for a SWD wells. The supervisory module monitors SWD well operations in real-time to ensure an even distribution of disposal water throughout the field for even pressure support of the subsurface reservoir. Each well generally is associated with an assigned injection target value (such as a target injection rate or target injection pressure). The target value is controlled by a surface controller by manipulating choke settings in the well. The choke settings enable a control of flow of water through the injection wells. Control of the choke settings enables maintenance of a desired injection pressure in a particular area. The supervisory module enables control of the choke settings to avoid over or under injection pressure values or injection rates. An injection rate can be compared with an assigned injection target in real-time basis to control well operations. The supervisory module generates alarm or alert data indicative of non-compliance if the injection rate deviates more than a threshold amount from the target value. For example, the threshold can be +10% of the assigned target value.

Figure 2:
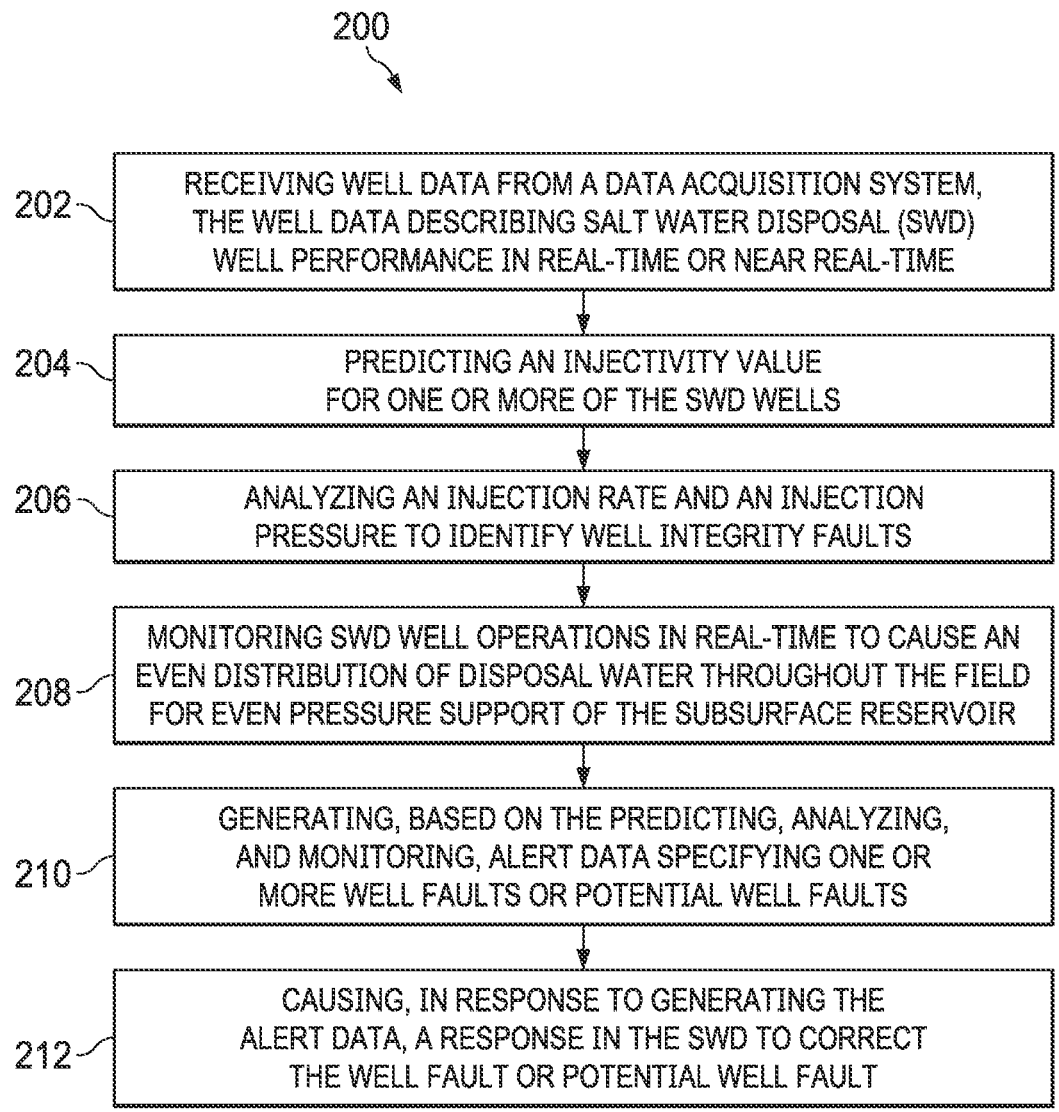
FIG. 2 shows a process for identifying and predicting well performance anomaly, downhole casing leaks, injection rate non-compliance using a machine learning model.

FIG. 2 shows an example process 200 for monitoring SWD well performance using predictive, supervisory, and analytical modules described in this specification. The process 200 includes parallel operation of the predictive module, the analytic module, and the supervisory module describe in this specification. The process 200 includes receiving (202), at the data processing system including the predictive, supervisory, and analytical modules, well data from the DAS, the well data describing the SWD well performance in real-time or near real-time. As previously described, the well data includes injection rate, an injection wellhead pressure, a wellhead temperature, a casing-casing annulus (CCA) pressure, an injection temperature, a tubing-casing annuls (TCA) pressure. Apart from real-time data, other reservoir data SBHP and II data are utilized from the well database for decision tree and conditional analysis. SBHP & II data are captured real-time or by wireline method for each well at a monthly frequency. Every field has some average injectivity rate like barrels of water injected per day per psi wellhead injection pressure.

The process 200 includes predicting (204), at the predictive module, an injectivity value for one or more of the SWD wells. In some implementations, the predictive module predicts an injectivity decline in one or more of the SWD wells. Injection pressure and injection rate will be used to calculate well injectivity. Injection rate and injection pressure can be plotted together and liner regression can be performed to find the slope which will be well injectivity as barrels of injection rate per day per psi of injection pressure. A trend analysis can be performed using machine learning to flag if the well require some treatment to restore injectivity. As previously described, the rise in injection pressure for same amount of injection rate that is decline in well injectivity performance may be due to near wellbore reservoir damage or an increase in reservoir 150 pressure or due to wellbore 130 obstruction. The data processing system flags the issue either due to reservoir damage or wellbore obstruction and skip the issue if it is due to increase in reservoir pressure.

The process 200 includes analyzing (206), by the analysis module, an injection rate and an injection pressure. The analytic module compares the injection rate to the injection pressure to identify well integrity issues, such as downhole casing leaks or ruptures. For example, if correlation of the injection rate and the injection pressure is an inverse correlation, the analysis module determines that there is a casing leak in the downhole casing. In another example, if the CCA changes abruptly, such as a change in the CCA value of more than a threshold percentage, the analysis module determines that a downhole leak may be present.

The supervisory module monitors (208) SWD well operations in real-time to cause an even distribution of disposal water throughout the field for even pressure support of the subsurface reservoir. The supervisory module ensures that SWD wells both individually and across the region are performing within compliance thresholds for injection rate for maintaining a target injection rate of liquid. As described, the supervisory module is configured to generate an alert if the current injection rate is over a threshold variance from the target injection rate (e.g., 10%).

The data processing system is configured to generate (210), based on the predicting, analyzing, and monitoring, alert data specifying one or more well faults or potential well faults. As previously described, the alert data specifies what faults or issues are occurring or are predicted to occur in the SWD wells. As a result, a validation of field data can be automated without daily intervention of field engineer. The system can be trained to filter outliers/noise data. Injection pressure and injection rate are used to calculate well injectivity. The data processing system uses linear regression model and/or decision tree analysis to determine whether a particular SWD well requires some treatment to restore injectivity. Injection pressure, injection rate, and CCA pressure data are analyzed by the data processing system to detect any anomaly like downhole casing leak. Once a probable fault is identified, a field engineer is enabled to physically confirm the leak in a timely manner (e.g., the same day, hour, etc. that the issue is detected). A daily injection rate is compared with assigned target rate for individual well and all wells in network. Any variance above and below 10% will give alarm to engineer to adjust the choke in the field to make well compliant with assigned target rate.

The data processing system is configured for causing (212), in response to generating the alert data, a response in the SWD to correct the well fault or potential well fault. The response can include an automatic response, such as actuating choke valves or reducing injection pressure. In some implementations, the response includes notifying an operational engineer to take action.

The data processing system is configured to identify faults in well performance or well integrity. Based on the type of fault identified, a field engineer confirms the fault in the field by deploying field diagnostic tools (running well logging, well testing, etc.). A specific solution is recommended based on the anomaly/fault type in the form of fault messages. For example, a fault message can report that "well injectivity has been declined by 10% in 6 months; the well is likely candidate for acid stimulation." In another example, the fault message indicates "there is sign of downhole casing leak/rupture. Please evaluate running extra liner or casing to fix the leak or other diagnostic work." In another message, the data processing system indicates "the well is over or under complaint from target rate by more than 10%. Please evaluate to adjust the surface choke to make well compliant." Other such examples are possible.

In some implementations, the data processing system that performs process 200 is configured to generate a classifier for generating predictions of SWD well faults or for identifying current SWD well faults. The output of the classifier can include probability values that a fault is occurring or may occur. In some implementations, the output data include a confusion matrix. The classification values represent a likelihood that a given anomaly/fault is included in the DAS generated data. The data processing system generates the classification value(s) for the sensor data by applying a machine learning model (such as executing machine learning model logic) on the sensor data, including the injection pressure and injection rate values. The sensor data are input into the machine learning model, which then outputs the classification values. Examples of the machine learning models used can include support vector machines (SVMs), Bayes models, decision forests, and regression models such as linear or logistic models. In some implementations, a random forest model (machine learning technique) is used. The reduced dataset is input into one or more of these models for training the models. During SWD operation, sensor data are input into the trained model.

The classifier relates the input SWD sensor data to the output prediction or identification of well faults or issues. The classifier can be trained using SWD that is known to represent a fault or be indicative of future faults.

The data processing system 100 is configured to generate an indication, such as an alert or flag, specifying each SWD fault or issue predicted or occurring in real time from a particular set of data (such as for a SWD well). The one or more flags or alerts are associated with the sensor data. The prediction can be used to guide SWD operation as previously described, reducing operational costs.

Figure 3:
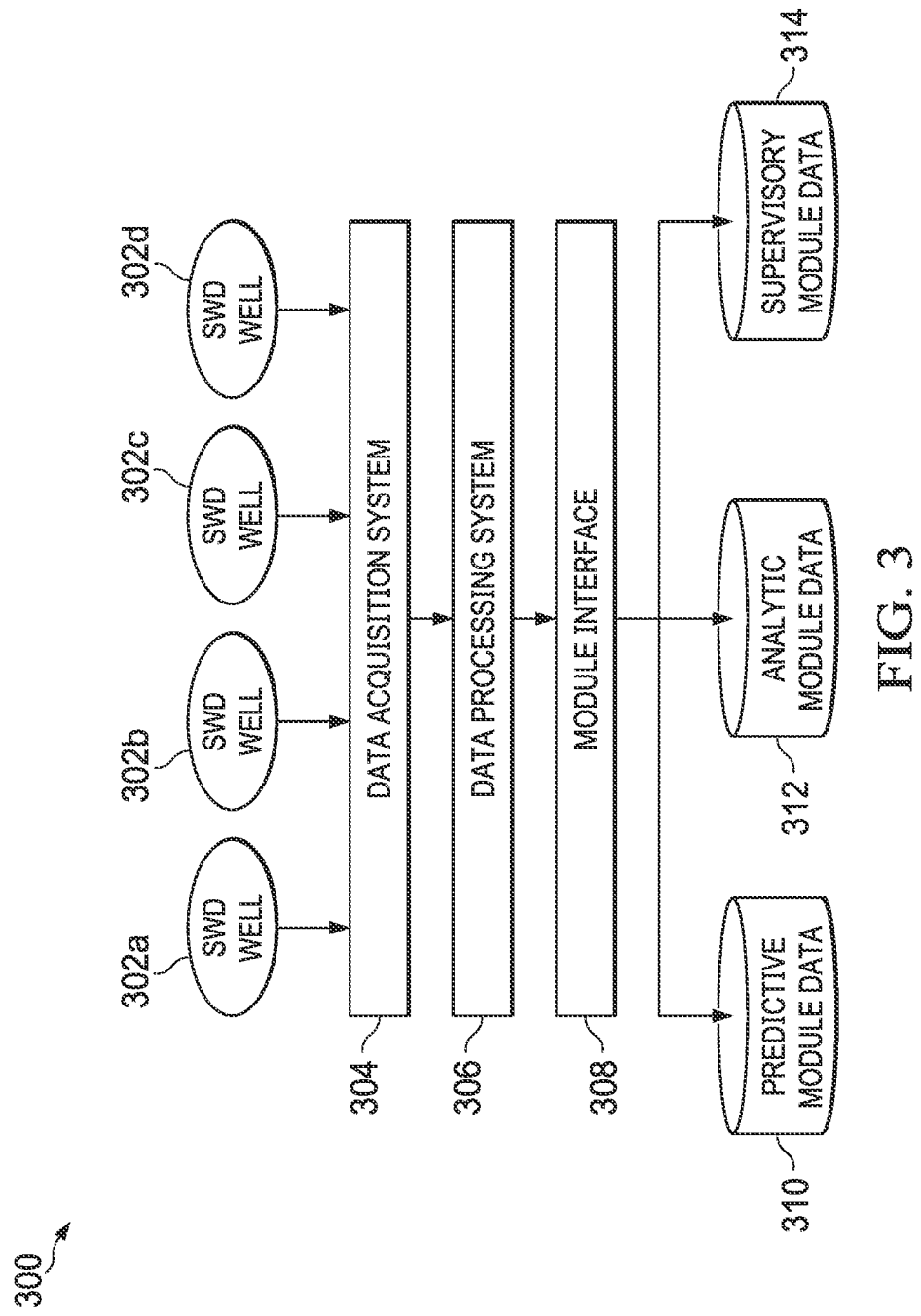
FIG. 3 shows system including a predictive module, an analytic module, and a supervisory module.

FIG. 3 represents SWD wells network 300 for use with the wellbore system 100. The network 300 includes a plurality of SWD wells 302a-d (collectively SWD wells 300). The network 300 includes a data acquisition system 304. The network 300 includes a data processing system 306. The data processing system 306 is configured to operate the predictive module, the analytic module, and the supervisory module described in this specification in relation to FIGS. 1A-2.

To access the data for each module, the data processing system 300 uses a module interface 308. The module interface 308 is configured to access the predictive module data 310, the analytic module data 312, and the supervisory module data 314 to support the predictive module, the analytic module, and the supervisory modules, respectively.

In some implementations, each of the predictive module data 310, the analytic module data 312, and the supervisory module data 314 are configured to store data relevant for the respective predictive, analytic, and supervisory modules. For example, the predictive module stores real-time well injectivity data, such as injection rate and injection pressure, and also historic or past injection rates and pressures for each of the SWD wells 302. The module stores reservoir data like SBHP, II specific to each well (a well database). The historic data are used to establish thresholds such as to identify deviations in operation from historic normal values.

Each of the predictive module data 310, the analytic module data 312, and the supervisory module data 314 include training data for training one or more classifiers for machine learning models for each of the respective predictive, analytic, and supervisory modules. For example, the predictive module stores labeled data that indicate normal operational values for injection rate and injection pressure. The predictive module data store 310 also includes labeled data related to one or more well faults associated with particular SWD wells 302, such as injectivity decline, downhole casing leakage, or any other faults for predicting. Similarly, each of the analytic module data 312 and the supervisory module data 314 include respective training data for generating classifiers for each of the analytic module and the supervisory module. Each of these training data are called the predictive training data, the analytic training data, and the supervisory training data, respectively. The predictive training data are used to generate a predictive module classifier. The analytic training data are used to generate an analytic module classifier. The supervisory training data are used to generate a supervisory module classifier. Thus, the data processing system 306 is configured to operate three differently trained machine learning models in parallel to accomplish each of the functions of the predictive module, the analytic module, and the supervisory module, respectively.

In some implementations, each of the machine learning models of the data processing system 306 can use the same data or portions of the same data from the data acquisition system 304 in different ways to generate different alerts. For example, the analytic module can compare correlations of the injection rate and injection pressure values over time to determine if the two values are correlated or inversely correlated and can also compare these values to the CCA pressure. A classifier can be trained to indicate what correlation value (or how fast the values are changing with respect to one another) is indicative of a fault. In parallel, the predictive module determines a ratio of the injection rate and injection pressure, to develop the analytic classifier and perform an independent analysis of the SWD well 302 data. Machine learning is performed in parallel for each of these modules independently to identify current or future well faults or issues. The same functionality is extended to the supervisory module, which includes a third independent machine learning module executing in parallel to identify well faults or to control operation of the SWD wells automatically to avoid well faults.

Figure 4A:
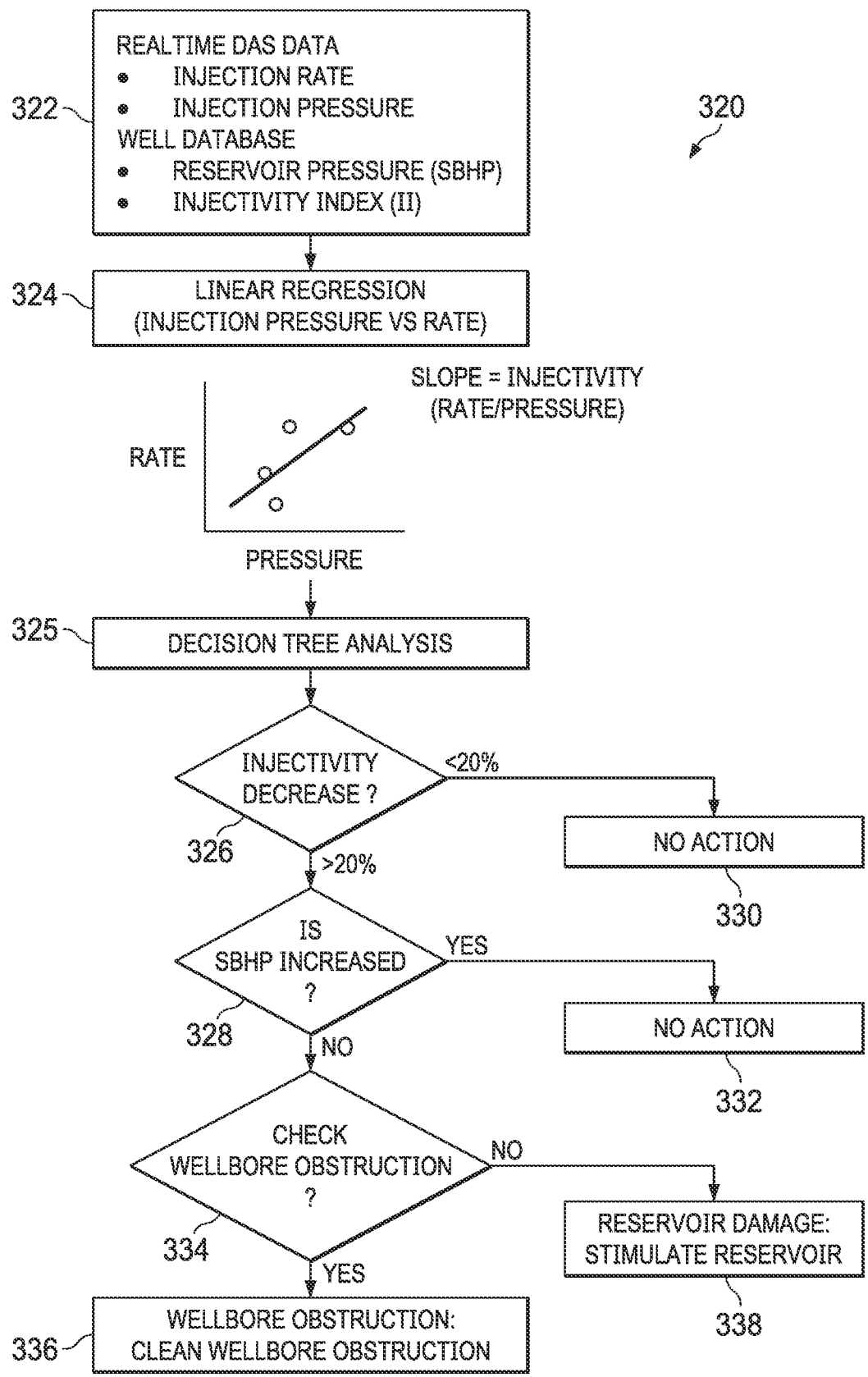
FIG. 4A represents a process performed by the predictive module of FIG. 3.
Figure 4B:
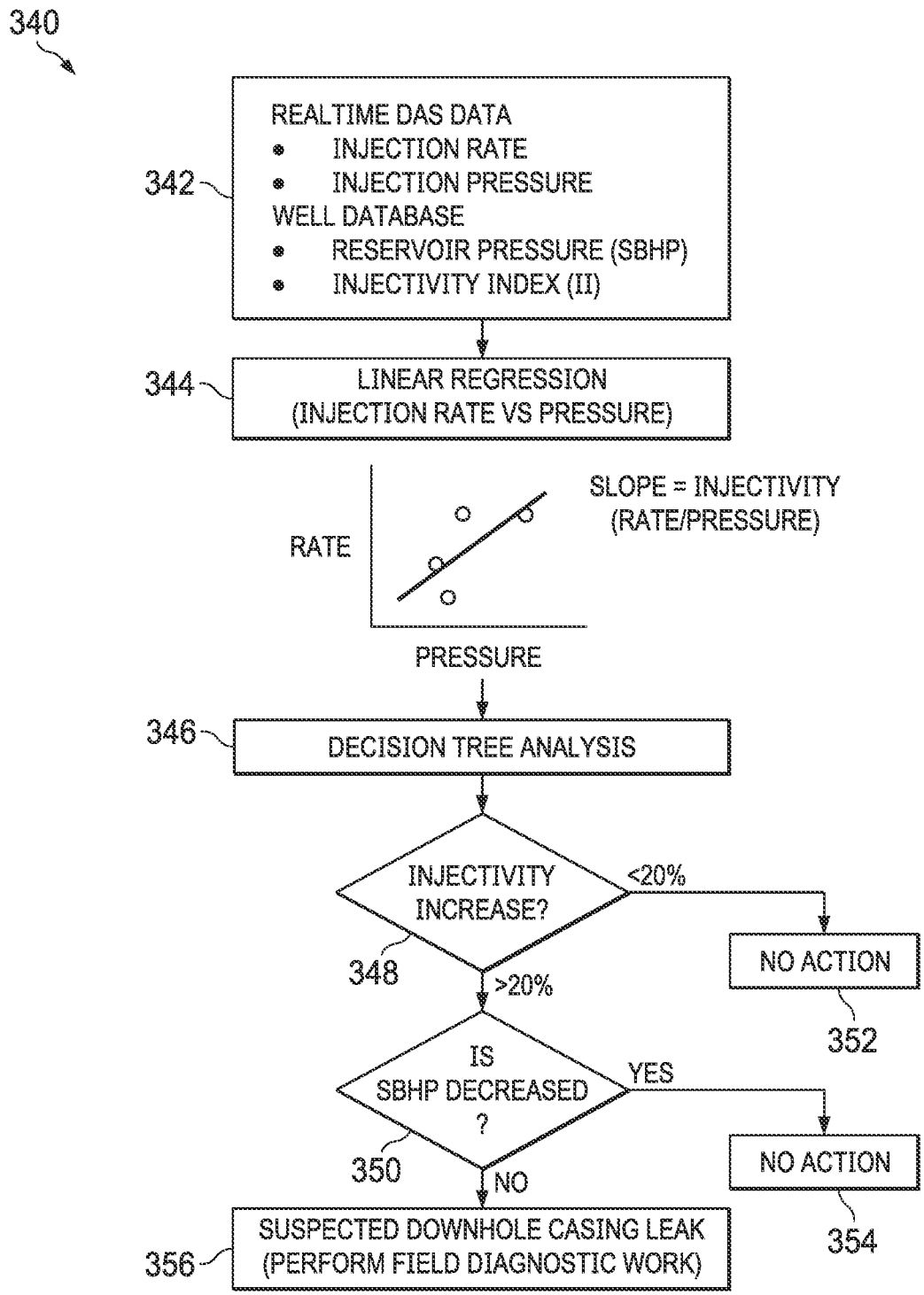
FIG. 4B represents a process performed by the analytic module of FIG. 3.
Figure 4C:
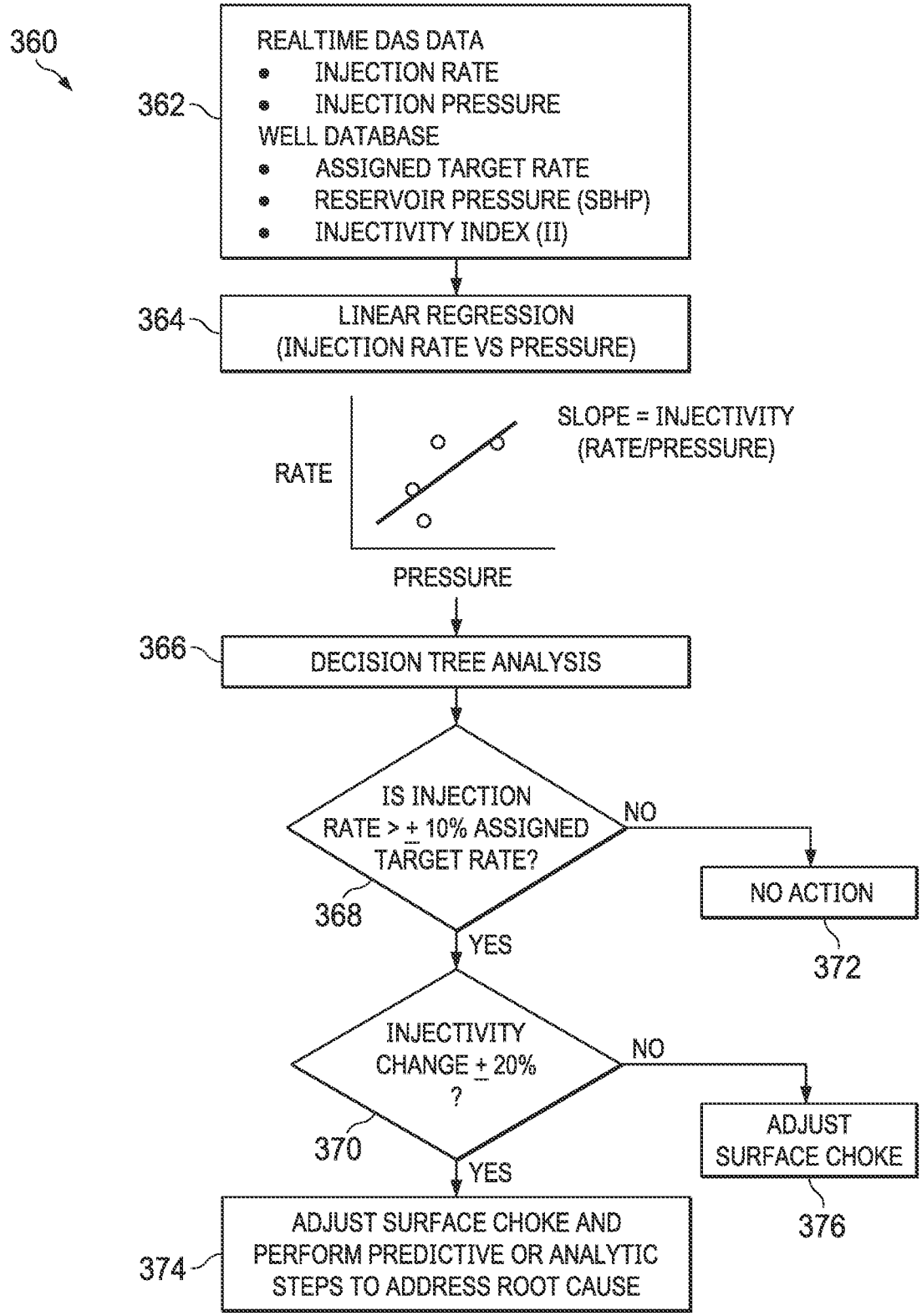
FIG. 4C represents a process performed by the supervisory module of FIG. 3.

FIGS. 4A-4C each show a process flow. Each module 310, 312, 314 applies linear regression and decision tree model to train the process/model and make future prediction of outcomes based on current data. The training data includes real-time injection pressure and rate and other attributes like temperature and CCA pressure plus well database data. The data will be selected from recent cases of such incidents like injectivity decline or downhole casing leaks. Classifiers/output include injectivity decline, downhole casing leak, and well rate over/under compliance.

FIG. 4A represents an example process 320 performed by the predictive module 310 of FIG. 3. In FIG. 4A, the process 320 includes receiving (322) well data. The well data include real-time DAS data that describe the injection rate and the injection pressure. The data include reservoir data such as SBHP data and II data. The process 320 includes performing (324) linear regression on the injection pressure values to determine a rate vs. pressure relationship. The process 320 includes a decision tree analysis (325) to classify this relationship. An injectivity status is determined (326). If there is injectivity decline less than 20%, no action is taken (330). If the injectivity decline is greater than 20%, the SBHP pressure data are analyzed (328). Thresholds other than 20% can be used for the injectivity decline, such as those obtained heuristically or through machine learning models.

If the SBHP data indicates increased reservoir pressure no action (332) is taken. If the pressure data do not show increased pressure, the data processing system generates an alert (334) to check for a wellbore obstruction. The process 320 includes removing (336) the wellbore obstruction or generating an alert causing the obstruction to be removed. The process 320 includes performing a simulation (338) of the reservoir to determine whether there is damage to the reservoir.

FIG. 4B represents a process 340 performed by the analytic module 312 of FIG. 3. In FIG. 4B, the process 340 includes receiving (342) well data. The well data include real-time DAS data that describe the injection rate and the injection pressure. The data include reservoir data such as SBHP data and II data. The process 340 includes performing (344) linear regression on the injection pressure values to determine a rate vs. pressure relationship. The process 340 includes a decision tree analysis (346) to classify this relationship. An injectivity status is determined (348). If the injectivity values are not increasing (e.g., increase less than a 20% threshold), no action is taken (352). If the injectivity is increasing (e.g., more than 20% over the baseline), the process 340 includes checking a status of the well pressure (350) from the SBHP data. If the well pressure is decreased (354), no action is taken. If the well pressure is not decreased, the module 312 determines that there is a suspected downhole casing leak (356). An alert can be generated to perform filed diagnostic work. In some implementations, the thresholds are determined using machine learning methods or from heuristic data.

FIG. 4C represents a process 360 performed by the supervisory module 314 of FIG. 3. In FIG. 4C, the process 360 includes receiving (362) well data. The well data include real-time DAS data that describe the injection rate and the injection pressure. The data include reservoir data such as SBHP data and II data. The process 360 includes performing (364) linear regression on the injection pressure values to determine a rate vs. pressure relationship. The process 360 includes a decision tree analysis (366) to classify this relationship. The process 360 includes analyzing (368) the injection rate. The module 314 determines whether the injection rate is deviating more than 10% (or other such determined threshold) from a baseline value (such as an assigned target rate). If the injection rate does not deviate from the assigned target rate, no action is taken (372). If the injection rate is deviating from the assigned target rate, the injectivity value is checked (370). If the injectivity changes more than 20% from a baseline value, the module 314 adjusts (374) a surface choke and performs the predictive process 320 or the analytic process 340 described previously to determine the root cause of the anomalous values. If the injectivity value change is less than 20% (or similar threshold), the module 314 adjusts the surface choke (376). In some implementations, the thresholds are determined using machine learning methods or from heuristic data.

Figure 5:
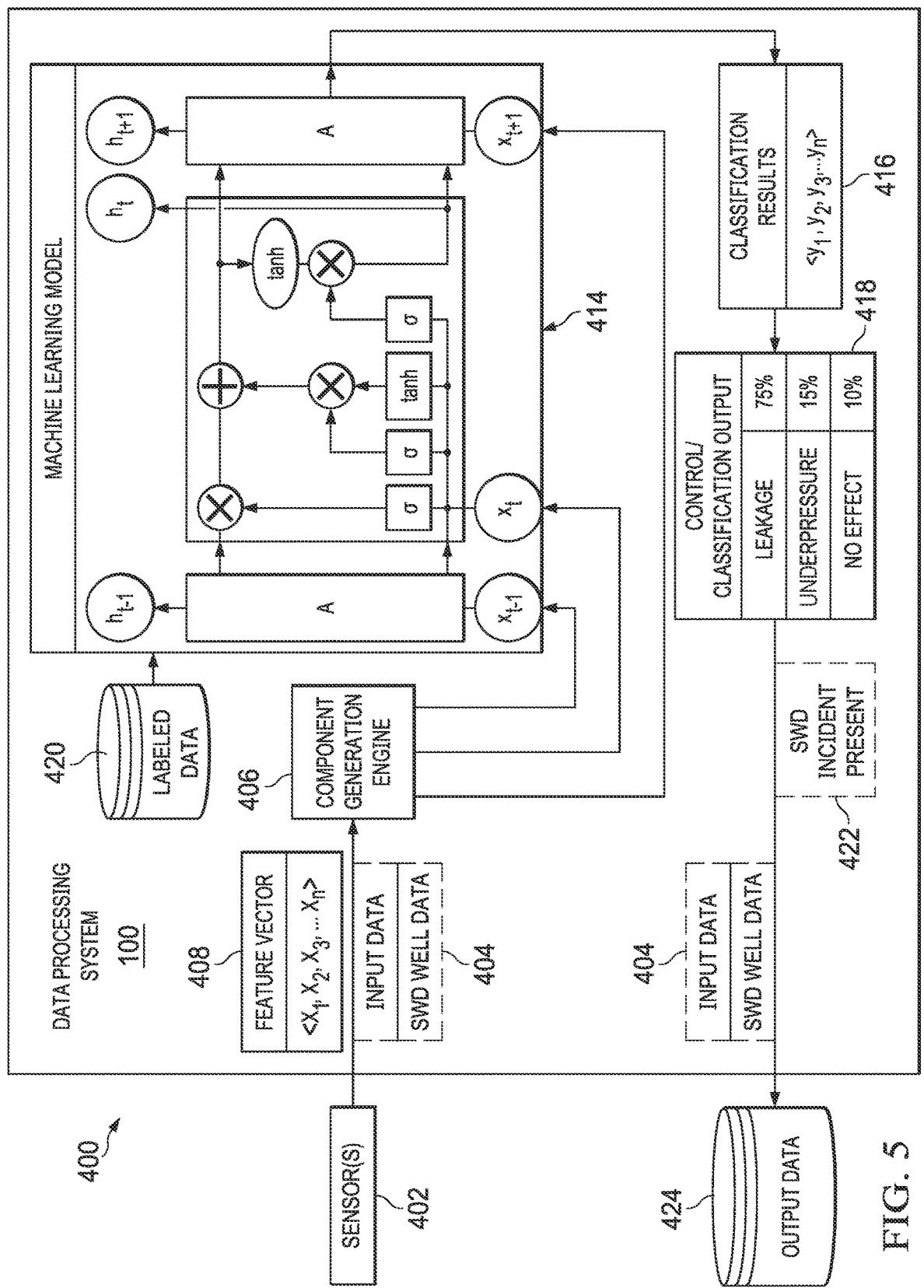
FIG. 5 shows an example data processing system for executing a machine learning model.

FIG. 5 represents a data processing system 400 for performing the processes described in this specification. The data processing system 400 can include the data processing system described in relation to FIGS. 1A-3. In the data processing system 400, sensor(s) 402 are configured to measure SWD data. The input data 404 includes the SWD data previously described. In this example, a support vector machine (SVM) is being used as the machine learning model. In this example, the input data are transformed into component data 408 by the component generation engine 406 so that the input data is in a format that can be processed by the SVM machine learning model 414. The machine learning model 414 is trained with labeled data 420, such as from a data store, that are generated as described in relation to FIG. 3. The data processing system 400 generates a feature vector 408 that represents the SWD in component form. If any additional preprocessing are required to prepare the values from the SWD data for processing by the machine learning model 414, the transform engine (not shown) can perform this preprocessing. Such preprocessing is performed by the data processing system 400 configured to adjust the format of any input data as needed for the particular machine learning model selected for processing the SWD data.

The machine learning model 414, trained by labeled data 420 as described previously in relation to FIG. 3, is configured to receive the feature vector 408 (or a transformed version of the vector) representing the SWD data and output classification results 416. The results 416 can include a confusion matrix representing classification outcomes for each of the possible outputs. For example, here, three control effects are shown, including a leakage, underpressure, or no effect (though generally more effects can be analyzed as previously described). As shown in prediction data 418, a probability or weight value is associated with each outcome. Here, a downhole leakage is weighted with the greatest value. The data processing system 400 outputs a classification that downhole casing rupture is present in output data 422. The output data 422 are presented on a user interface. In some implementations, the output data 422 are stored in a data store 424 or transmitted to a remote computing system for presentation or further processing by the remote data processing system.

Figure 6:
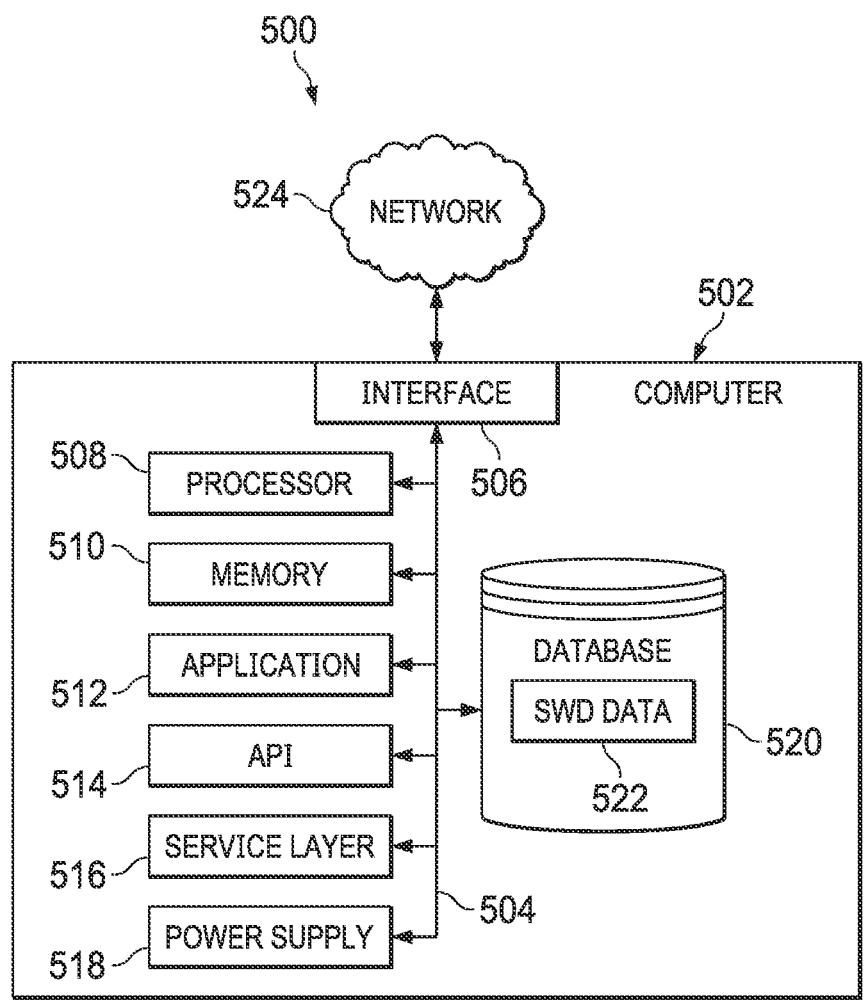
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example data processing system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 504. In some implementations, any or all of the components of the computer 502, including hardware or software components, can interface with each other or the interface 506 (or a combination of both), over the system bus 504. Interfaces can use an application programming interface (API) 514, a service layer 516, or a combination of the API 514 and service layer 516. The API 514 can include specifications for routines, data structures, and object classes. The API 514 can be either computer-language independent or dependent. The API 514 can refer to a complete interface, a single function, or a set of APIs.

The service layer 516 can provide software services to the computer 502 and other components (whether illustrated or not) that are communicably coupled to the computer 502. The functionality of the computer 502 can be accessible for all service consumers using this service layer. Software services, such as those provided by the service layer 516, can provide reusable, defined functionalities through a defined interface. For example, the interface can be software written in JAVA, C++, or a language providing data in extensible markup language (XML) format. While illustrated as an integrated component of the computer 502, in alternative implementations, the API 514 or the service layer 516 can be stand-alone components in relation to other components of the computer 502 and other components communicably coupled to the computer 502. Moreover, any or all parts of the API 514 or the service layer 516 can be implemented as child or sub-modules of another software module, enterprise application, or hardware module without departing from the scope of the present disclosure.

The computer 502 includes an interface 506. Although illustrated as a single interface 506 in FIG. 6, two or more interfaces 506 can be used according to particular needs, desires, or particular implementations of the computer 502 and the described functionality. The interface 506 can be used by the computer 502 for communicating with other systems that are connected to the network 530 (whether illustrated or not) in a distributed environment. Generally, the interface 506 can include, or be implemented using, logic encoded in software or hardware (or a combination of software and hardware) operable to communicate with the network 530. More specifically, the interface 506 can include software supporting one or more communication protocols associated with communications. As such, the network 530 or the hardware of the interface can be operable to communicate physical signals within and outside of the illustrated computer 502.

The computer 502 includes a processor 508. Although illustrated as a single processor 508 in FIG. 6, two or more processors 508 can be used according to particular needs, desires, or particular implementations of the computer 502 and the described functionality. Generally, the processor 508 can execute instructions and can manipulate data to perform the operations of the computer 502, including operations using algorithms, methods, functions, processes, flows, and procedures as described in the present disclosure.

The computer 502 also includes a database 520 that can hold data (for example, SWD data 522) for the computer 502 and other components connected to the network 530 (whether illustrated or not). For example, database 520 can be an in-memory, conventional, or a database storing data consistent with the present disclosure. In some implementations, database 520 can be a combination of two or more different database types (for example, hybrid in-memory and conventional databases) according to particular needs, desires, or particular implementations of the computer 502 and the described functionality. Although illustrated as a single database 520 in FIG. 6, two or more databases (of the same, different, or combination of types) can be used according to particular needs, desires, or particular implementations of the computer 502 and the described functionality. While database 520 is illustrated as an internal component of the computer 502, in alternative implementations, database 520 can be external to the computer 502.

The computer 502 also includes a memory 510 that can hold data for the computer 502 or a combination of components connected to the network 530 (whether illustrated or not). Memory 510 can store any data consistent with the present disclosure. In some implementations, memory 510 can be a combination of two or more different types of memory (for example, a combination of semiconductor and magnetic storage) according to particular needs, desires, or particular implementations of the computer 502 and the described functionality. Although illustrated as a single memory 510 in FIG. 6, two or more memories 510 (of the same, different, or combination of types) can be used according to particular needs, desires, or particular implementations of the computer 502 and the described functionality. While memory 510 is illustrated as an internal component of the computer 502, in alternative implementations, memory 510 can be external to the computer 502.

The application 512 can be an algorithmic software engine providing functionality according to particular needs, desires, or particular implementations of the computer 502 and the described functionality. For example, application 512 can serve as one or more components, modules, or applications. Further, although illustrated as a single application 512, the application 512 can be implemented as multiple applications 512 on the computer 502. In addition, although illustrated as internal to the computer 502, in alternative implementations, the application 512 can be external to the computer 502.

The computer 502 can also include a power supply 518. The power supply 518 can include a rechargeable or non-rechargeable battery that can be configured to be either user- or non-user-replaceable. In some implementations, the power supply 518 can include power-conversion and management circuits, including recharging, standby, and power management functionalities. In some implementations, the power-supply 518 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure.

Moreover, the present disclosure contemplates that many users can use one computer 502 and one user can use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware—and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method for monitoring and managing day to day performance of a group of salt water disposal wells in a network to prevent operational faults from occurring, the method comprising:

performing a well measurement to generate salt-water disposal (SWD) well data; retrieving a machine learning model that is trained using labeled SWD data, the labeled SWD data representing one or more SWD well faults causing respective data signatures in the SWD data, each respective data signature being associated with a corresponding label identifying the SWD well fault for a particular SWD well;

inputting the SWD well data generated in real-time based on SWD well operation, into the machine learning model;

generating, by the machine learning model based on the inputting, a classification output representing a predicted well injection pressure or injection rate of the particular SWD well, the predicted well injection pressure or the predicted injection rate being outside a range of values representing normal operation of the particular SWD well;

generating, based on the classification output, a prediction of an operational fault in the particular SWD well; and generating, based on the prediction, control data for changing operation of the particular SWD well.

2. The method of claim 1, further comprising:

receiving reservoir data from well database at the machine learning model to classify well performance and well integrity of the particular SWD well;

classifying the reservoir data using the machine learning model; and based on the classifying, generating an alarm identifying a fault, the alarm enabling a field engineer to rectify the fault in a timely manner; and enabling control, based on the control data and the alarm, of an injection rate, an injection pressure, or both the injection rate and injection pressure of a SWD well.

3. The method of claim 1, further comprising training the machine learning model prior to inputting the SWD well data, wherein training the machine learning model comprises:

obtaining SWD well data from the one or more SWD wells in an environment;

labeling the SWD well data as representing an expected relationship between an injection pressure and an injection rate of the SWD well; and inputting the labeled SWD well data into the machine learning model to train the machine learning model.

4. The method of claim 1, wherein the SWD data include at least one of an injection rate, an injection wellhead pressure, a wellhead temperature, and a casing-casing annulus pressure.

5. The method of claim 1, wherein the machine learning model comprises a supervised machine learning model.

6. The method of claim 1, further comprising:

performing a data quality check for the measured SWD data, the data quality check configured to remove data comprising missing values, out of range values, saturated sensor values, or values from a damaged sensor.

7. The method of claim 1, further comprising:

generating alert data, based on the control data, the alert data instructing a controller of the SWD well to reduce or increase an injection rate.

8. A data processing system for monitoring and managing day to day performance of a network of salt water disposal wells to prevent operational faults from occurring, the data processing system comprising:

one or more sensors;

at least one processor; and a memory storing instructions that, when executed by the at least one processor, cause the at least one processor to perform operations comprising:

performing a well measurement to generate salt-water disposal (SWD) well data;

retrieving a machine learning model that is trained using labeled SWD data, the labeled SWD data representing one or more SWD well faults causing respective data signatures in the SWD data, each respective data signature being associated with a corresponding label identifying the SWD well fault for a particular SWD well;

inputting the SWD well data generated in real-time based on SWD well operation, into the machine learning model;

generating, by the machine learning model based on the inputting, a classification output representing a predicted well injection pressure or injection rate of the particular SWD well, the predicted well injection pressure or the predicted injection rate being outside a range of values representing normal operation of the particular SWD well; and generating, based on the prediction, control data for changing operation of the particular SWD well.

9. The data processing system of claim 8, the operations further comprising: receiving reservoir data from well database at the machine learning model to classify well performance and well integrity of the particular SWD well;

based on a classification of well performance, generating an alarm identifying a fault, the alarm enabling a field engineer to rectify the fault in a timely manner; and enabling control, based on the control data and the alarm, of an injection rate, an injection pressure, or both the injection rate and injection pressure of a SWD well.

10. The data processing system of claim 8, the operations further comprising training the machine learning model prior to inputting the SWD well data, wherein training the machine learning model comprises:

obtaining SWD well data from the one or more SWD wells in an environment; labeling the SWD well data as representing an expected relationship between an injection pressure and an injection rate of the SWD well; and inputting the labeled SWD well data into the machine learning model to train the machine learning model.

11. The data processing system of claim 8, wherein the SWD data include at least one of an injection rate, an injection wellhead pressure, a wellhead temperature, and a casing-casing annulus pressure.

12. The data processing system of claim 8, the operations further comprising: performing a data quality check for the measured SWD data, the data quality check configured to remove data comprising missing values, out of range values, saturated sensor values, or values from a damaged sensor.

13. The data processing system of claim 8, the operations further comprising: generating alert data, based on the control data, the alert data instructing a controller of the SWD well to reduce or increase an injection rate.

14. One or more non-transitory computer readable media storing instructions for monitoring and managing day to day performance of a network of salt water disposal wells to prevent operational faults from occurring, the instructions, when executed by at least one processor, configured to cause the at least one processor to perform operations comprising:

performing a well measurement to generate salt-water disposal (SWD) well data; retrieving a machine learning model that is trained using labeled SWD data, the labeled SWD data representing one or more SWD well faults causing respective data signatures in the SWD data, each respective data signature being associated with a corresponding label identifying the SWD well fault for a particular SWD well;

inputting the SWD well data generated in real-time based on SWD well operation, into the machine learning model;

generating, by the machine learning model based on the inputting, a classification output representing a predicted well injection pressure or injection rate of the particular SWD well, the predicted well injection pressure or the predicted injection rate being outside a range of values representing normal operation of the particular SWD well; and generating, based on the prediction, control data for changing operation of the particular SWD well.

15. The one or more non-transitory computer readable media of claim 14, the operations further comprising:

receiving reservoir data from well database at the machine learning model to classify well performance and well integrity of the particular SWD well;

classifying the reservoir data using the machine learning model; and based on the classifying, generating an alarm identifying a fault, the alarm enabling a field engineer to rectify the fault in a timely manner; and enabling control, based on the control data and the alarm, of an injection rate, an injection pressure, or both the injection rate and injection pressure of a SWD well.

16. The one or more non-transitory computer readable media of claim 14, further comprising training the machine learning model prior to inputting the SWD well data, wherein training the machine learning model comprises:

obtaining SWD well data from the one or more SWD wells in an environment; labeling the SWD well data as representing an expected relationship between an injection pressure and an injection rate of the SWD well; and inputting the labeled SWD well data into the machine learning model to train the machine learning model.

17. The one or more non-transitory computer readable media of claim 14, wherein the SWD data include at least one of an injection rate, an injection wellhead pressure, a wellhead temperature, and a casing-casing annulus pressure.

18. The one or more non-transitory computer readable media of claim 14, wherein the machine learning model comprises a supervised machine learning model.

19. The one or more non-transitory computer readable media of claim 14, the operations further comprising:

performing a data quality check for the measured SWD data, the data quality check configured to remove data comprising missing values, out of range values, saturated sensor values, or values from a damaged sensor.

20. The one or more non-transitory computer readable media of claim 14, the operations further comprising:

generating alert data, based on the control data, the alert data instructing a controller of the SWD well to reduce or increase an injection rate.

* * * * *